United States Patent [19]

Johnson

[11] Patent Number: 4,662,602
[45] Date of Patent: May 5, 1987

[54] METERING VALVE

[75] Inventor: Dwight N. Johnson, Carlsbad, Calif.

[73] Assignee: Masco Corporation, Taylor, Mich.

[21] Appl. No.: 791,772

[22] Filed: Oct. 28, 1985

[51] Int. Cl.$^4$ .......................................... F16K 31/128
[52] U.S. Cl. ....................................... 251/44; 251/33; 251/46
[58] Field of Search ....................... 251/25, 32, 33, 39, 251/40, 46, 74, 75, 61.2, 38, 44; 137/418

[56] References Cited

U.S. PATENT DOCUMENTS 1,628,600  5/1927  Cowley .................................. 251/25
3,222,996 12/1965  Thieme et al. ....................... 251/25
4,134,570  1/1979  Walker ................................. 251/40

FOREIGN PATENT DOCUMENTS 664143  4/1948  United Kingdom ............... 251/61.2

Primary Examiner—A. Michael Chambers
Assistant Examiner—John C. Fox
Attorney, Agent, or Firm—Mason, Kolehmainen, Rathburn & Wyss

[57] ABSTRACT

A valve for delivering a metered flow of liquid for flushing of a plumbing fixture or the like includes inlet and outlet ports and a main valve controlling flow from the inlet to the outlet port. A control chamber is in pressure communication with the main valve and a restricted flow path from the inlet port to the control chamber increases the control pressure to hold the main valve closed in a standby condition. A pilot valve is opened by an actuator to reduce control pressure and initiate a cycle of operation of the main valve. A snap acting mechanism is movable between two stable positions for opening and closing the pilot valve. The actuator is capable of operating the snap acting mechanism for opening the pilot valve in its fully opened position closes the pilot valve regardless of the position of the actuator.

14 Claims, 12 Drawing Figures

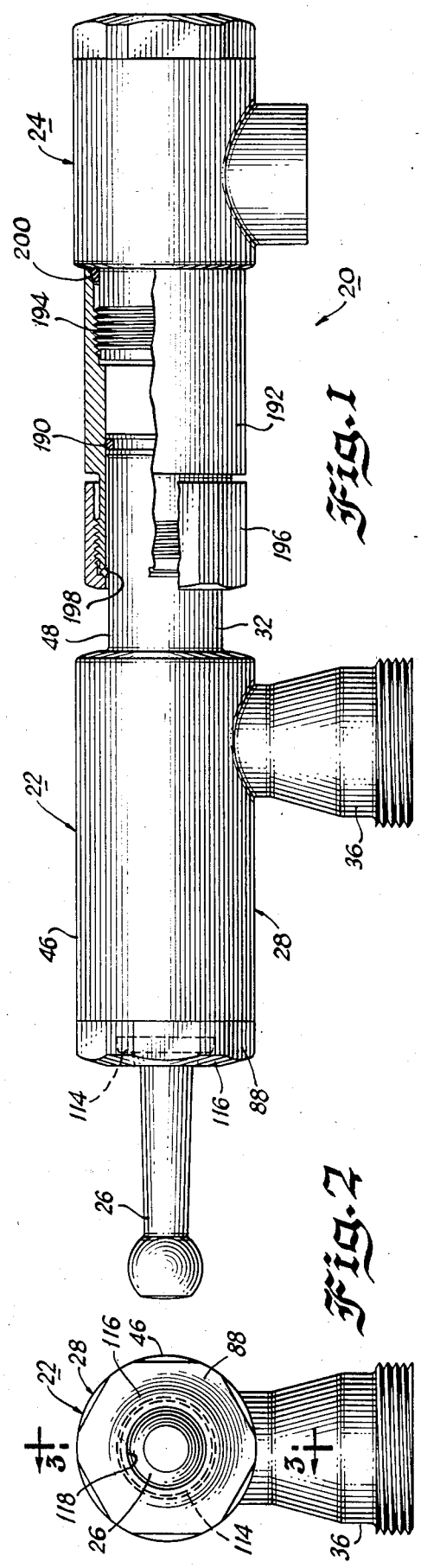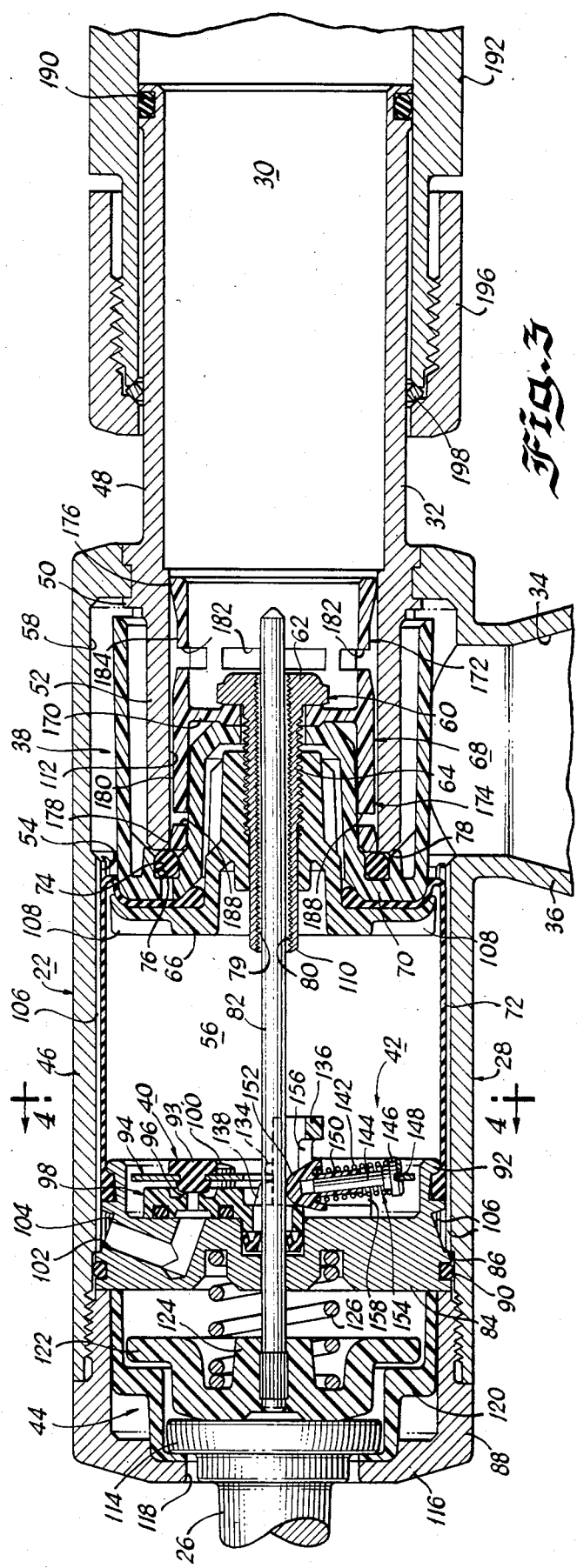

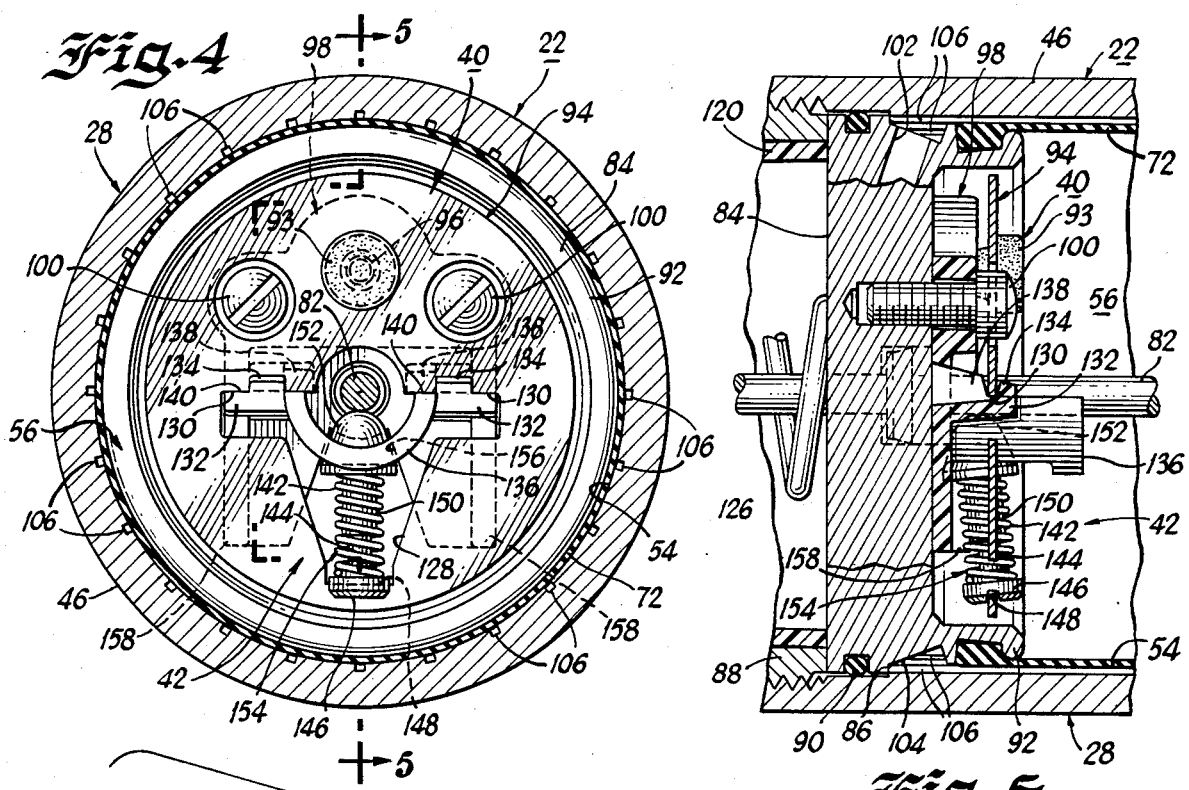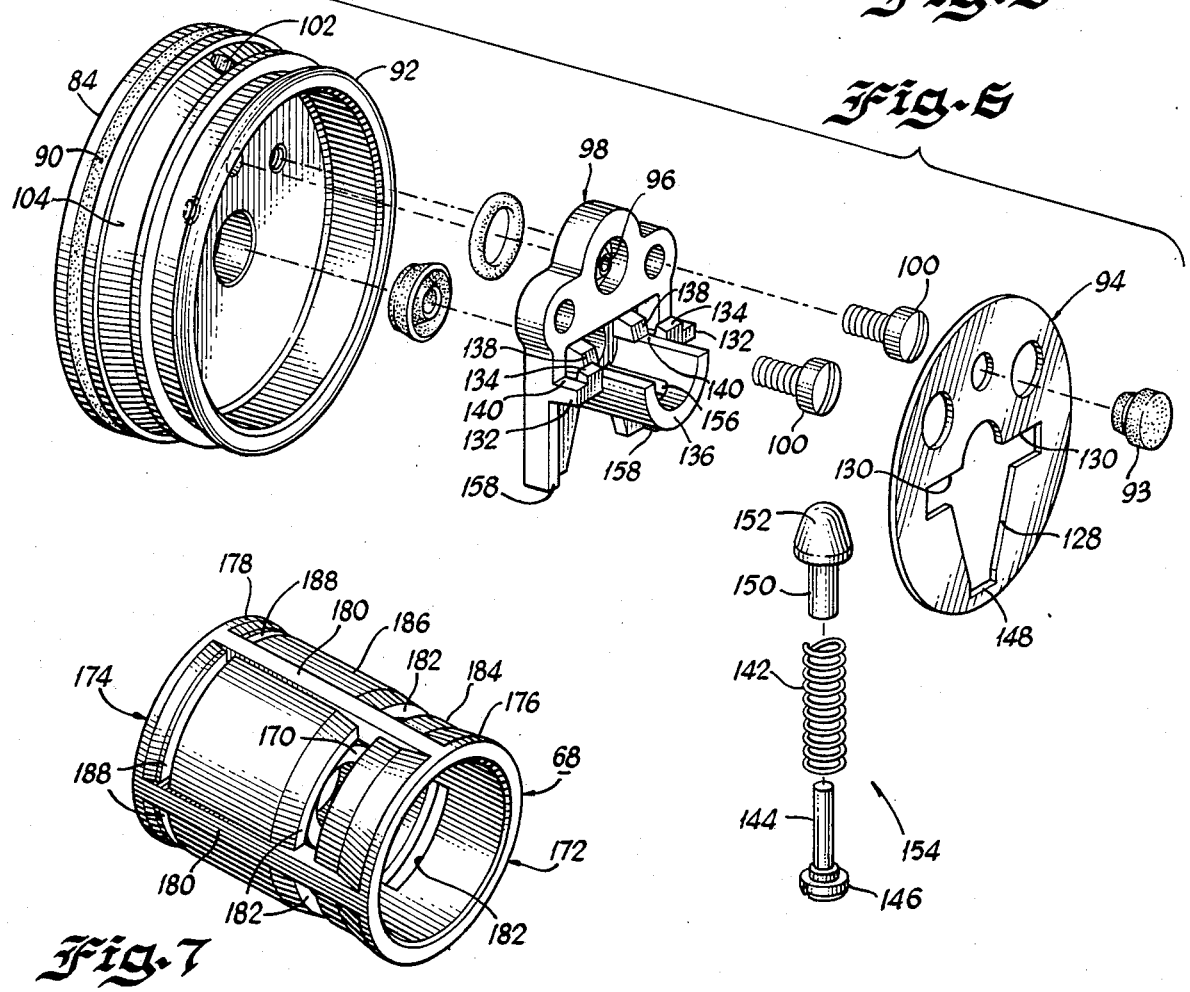

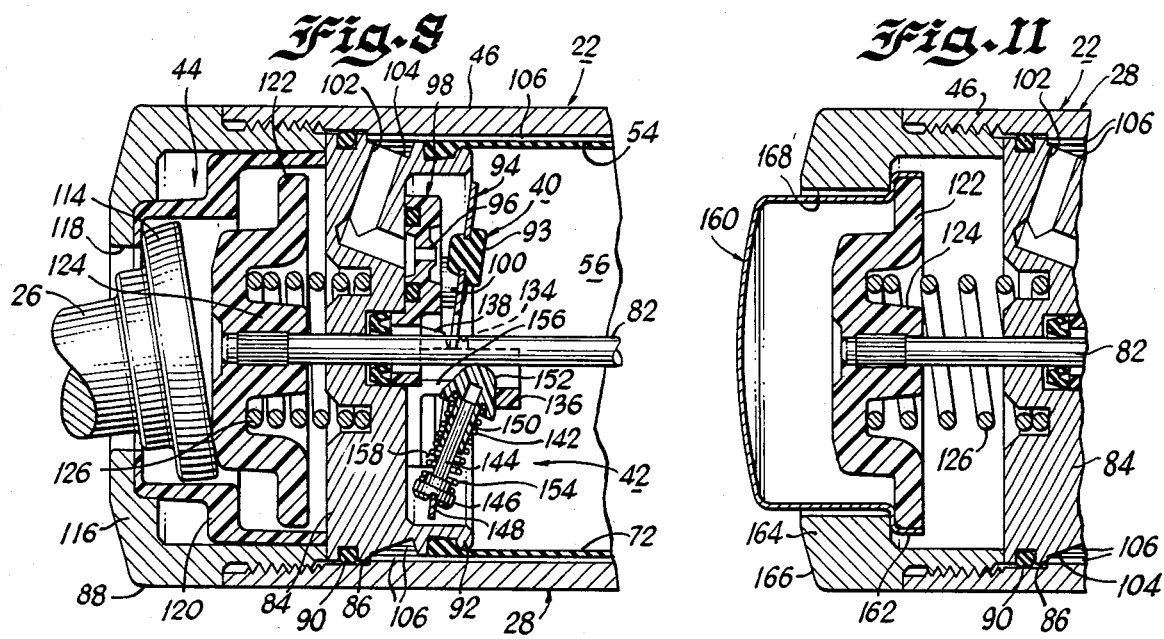
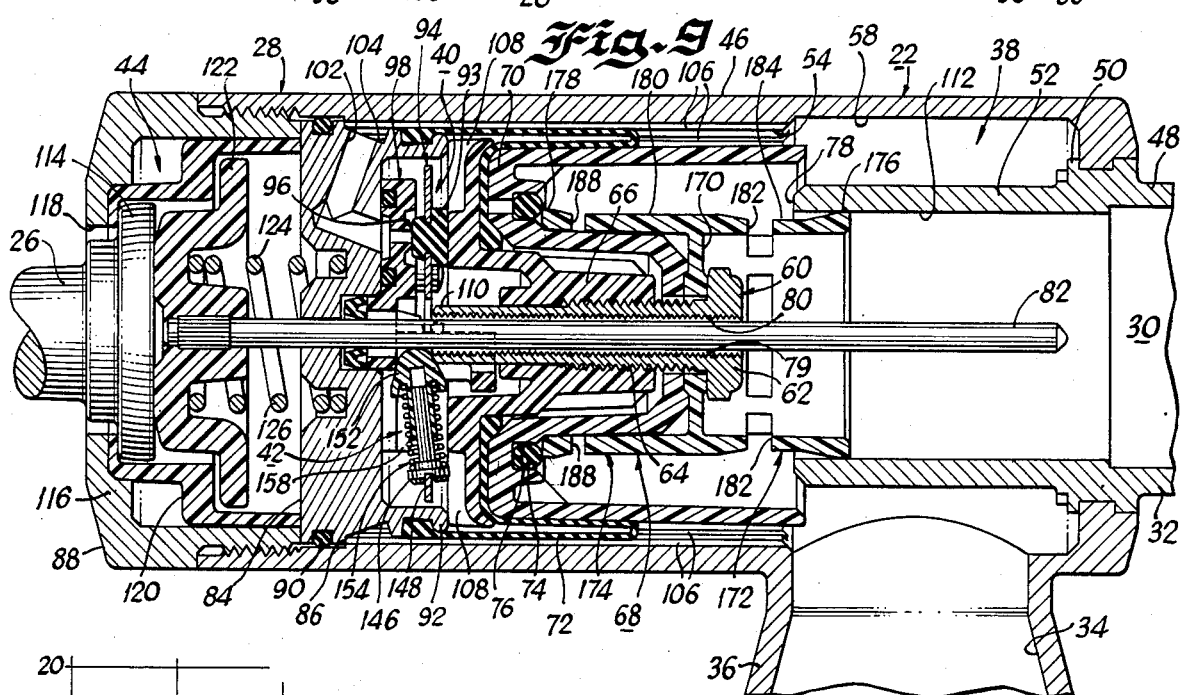
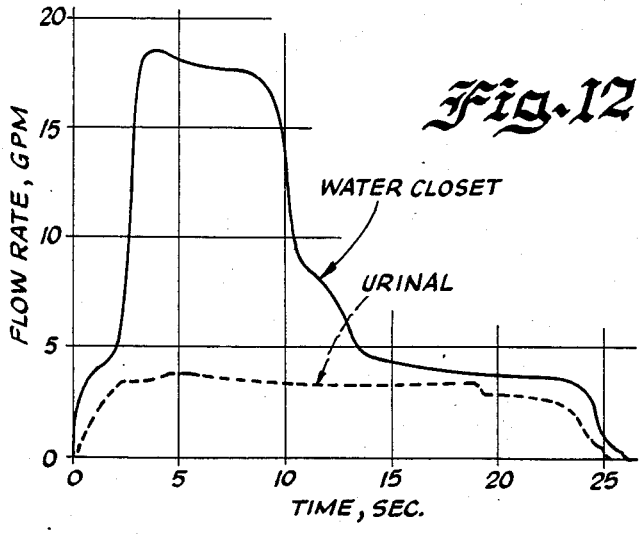
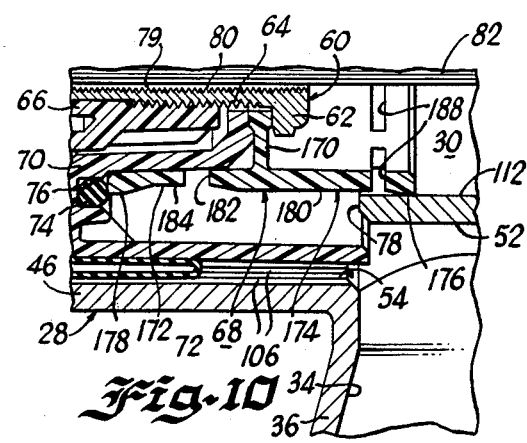

METERING VALVE

The present invention relates to improvements in metering valves such as metering flush valves for toilet fixture flushing systems.

Metering valves, sometimes called "flushometer" valves are widely used in water fixture flushing systems for commercial structures such as office buildings, factories, hotels, hospitals and the like where relatively high capacity water systems are available. Typical metering flush valves include a main valve operable through a flushing cycle when a pilot valve is opened by an actuator. Metering flush valves of the type used in the past have been complex and thus expensive to manufacture and assemble and have been difficult to service. Other difficulties with metering flush valves used in the past include wide variation in liquid delivery for different supply pressures.

Metering valves are also used for other purposes. One example is a faucet control valve called a "slow-close" faucet operating to provide a metered amount of flow and then shut off in response to actuation. Aspects of the present invention are applicable not only to metering flush valves but also to other types of metering valves.

Among the objects of the present invention are to provide a metering valve having an improved pilot valve operating mechanism; to provide a metering valve capable of easily being adapted for different metered flow configurations; to provide an economical and easily manufactured and serviced metering valve; to provide a metering valve capable of delivering predictable and consistent metered flow over a range of input pressures; to provide a metering valve easily modified for either lever or pushbutton operation; and to provide a metering valve overcoming disadvantages of metering flush valves and other metering valves used in the past.

In brief, in accordance with the above and other objects and advantages of the present invention, there is provided a metering valve including a housing having inlet and outlet ports and a main valve controlling flow from the inlet to the outlet port. A control chamber in the housing is in pressure communication with the main valve and applies a control pressure to the main valve. A restricted flow path from the inlet port to the control chamber holds the main valve closed in a standby condition. A pilot valve communicates with the control chamber and reduces the control pressure to initiate a cycle of main valve operation when the pilot valve is opened. A bistable snap acting mechanism operates the pilot valve between open and closed positions. An actuator operates the snap acting mechanism to open the pilot valve.

The present invention together with the above and other objects and advantages may be best understood from the following detailed description of the preferred embodiments illustrated in the drawings, wherein:

FIG. 1 is a side elevational view of a flushing system for a toilet fixture including a metering valve constructed in accordance with the present invention;

FIG. 2 is an end view of the metering valve of FIG. 1;

FIG. 3 is an enlarged sectional view of the metering valve taken along the line 3—3 of FIG. 2;

FIG. 4 is a sectional view taken along the line 4—4 of FIG. 3 and illustrating the pilot valve portion of the metering valve;

FIG. 5 is a sectional view taken along the line 5—5 of FIG. 4;

FIG. 6 is an exploded perspective view illustrating the components of the pilot valve and pilot valve actuating mechanism;

FIG. 7 is a perspective view of the metering plug of the metering valve;

FIG. 8 is a view similar to part of FIG. 3 illustrating the actuation of the pilot valve;

FIG. 9 is a view similar to part of FIG. 3 illustrating the main valve in its fully opened position;

FIG. 10 is a view similar to part of FIG. 3 illustrating the alternate position of the metering plug;

FIG. 11 is a view similar to part of FIG. 3 and illustrating an alternative embodiment in which the metering valve is actuated by a pushbutton rather than a lever; and FIG. 12 is a graph illustrating two different liquid flow configurations provided by the metering valve.

Having reference now to the drawings and initially to FIG. 1, there is illustrated a flushing system designated as a whole by the reference character 20 including a metering valve generally designated as 22 and constructed in accordance with the principles of the present invention. In the system 20, liquid is supplied to the metering valve 22 through a control stop 24. When the metering valve is actuated by an operating lever 26, a cycle of operation takes place during which a predetermined quantity of liquid is provided in a predetermined flow configuration from a source of pressurized liquid through the control stop 24 and metering valve 22 to a plumbing fixture such as a water closet or urinal (not shown).

Control stop 24 functions to throttle or choke the flow of liquid through the flushing system 20 at elevated water pressure, to prevent flow through the system 20 and trap inlet pressure at the inlet of the metering valve 22 in the event of loss of supply pressure, and serves as a shut off to permit servicing of the metering valve 22. Control stop 24 is described in detail in my copending U.S. patent application filed on the same day as the present application, Ser. No. 791,771. That copending application is incorporated herein by reference and may be consulted for a description of the structure and operation of the control stop 24 beyond that required for an understanding of the present invention. It should be understood that principles of the present invention are applicable to metering valves used in other types of liquid delivery systems.

In general, metering valve 22 includes a housing 28 having an inlet port 30 defined in an axially extending conduit portion 32 and an outlet port 34 defined in an externally threaded fitting 36 adapted to be connected to a urinal or water closet plumbing fixture. Contained within the housing are a main valve assembly 38, a pilot valve 40, a pilot valve operating assembly 42 and an actuator assembly 44 including the operating lever 26. A flushing cycle is initiated by operation of the actuator assembly 44 to open pilot valve 40 through operation of the pilot valve operating assembly 42. Opening of pilot valve 40 in turn opens the main valve assembly 38 for a cycle of operation in which the pilot valve 40 is reclosed and a metered and configured delivery of liquid occurs.

Housing 28 includes a generally cylindrical body 46 from which the outlet fitting 36 extends in a transverse direction. An inlet tube 48 is secured to an end of body 46 by staking or flaring a portion 50 over the lip of a circular opening in the body end wall. Inlet tube 48 includes the inlet conduit portion 32 as well as a valve seat portion 52 extending axially into a central cavity 54 defined within body 46.

Main valve assembly 38 divides cavity 54 into a control chamber 56 and an outlet region 58 in unrestricted communication with the outlet port 34. The main valve assembly 38 is in the form of a piston movable in cavity 54 and includes a restrictor screw 60 having a head 62 and a shank portion 64 threaded into a piston guide member 66. A metering plug 68 and a piston body 70 are clamped between screw 60 and guide 66 when they are threaded together. A rolling diaphragm 72 has one end clamped between the guide 66 and the piston body 70 and cooperates with the main valve assembly 38 in sealing the control chamber 56 from the outlet region 58. An advantage of the main valve assembly 38 of the metering valve 22 is that it is made up of economically manufactured components and is assembled simply by threading screw 60 into guide member 66.

An O-ring seal 74 is carried in a groove 76 of the piston body 70 and in the closed main valve position illustrated in FIG. 3, the seal 74 engages a valve seat region 78 defined on the innermost end of the valve seat portion 52 of inlet tube 48. In this closed position, liquid cannot flow between the inlet port 30 and the outlet port 34.

Inlet pressure introduced into the control chamber 56 normally maintains the main valve assembly 38 in its closed position. Inlet pressure is introduced into the control chamber 56 through a restricted passage 79 defined by the clearance between a central axial opening 80 in the restrictor screw 60 and a restrictor rod 82 coinciding with the central axis of the housing 28. The cross sectional area of the rod 82 is such as to define a restricted flow path within the opening 80. For example, the outside diameter of the rod may be somewhat smaller than the minimum inside diameter of opening 80. Alternatively, the rod or a portion thereof may have a noncircular cross section. The amount of restriction is easily varied by selecting the shape of rod 82 and/or of opening 80. Opening 80 is provided with a fine internal thread configuration so that the flow path restriction is accurately determined. Since the rod 82 and main valve assembly 38 including restrictor screw 60 move relative to one another during operation of the metering valve 22, the restricted path is self-cleaning and does not become blocked or clogged with liquid-borne particles or debris.

At the end opposite the main valve assembly 38, the control chamber 56 is bounded by a bulkhead 84 clamped in cavity 54 against a stop edge 86 by a collar or cap 88 threaded to an end of the body 46. An O-ring seal 90 between bulkhead 84 and body 46 isolates the cavity 54 from the region of the actuator assembly 44. Bulkhead 84 includes an annular projecting rib 92 holding an end of the diaphragm 72 in position to cooperate in isolating the control chamber 56.

A cycle of operation of the metering valve 22 is initiated by opening of the pilot valve 40. Valve 40 includes a valve member 93 mounted on a trip plate 94 and engageable with a valve seat 96 defined on a pilot valve base 98 attached to the bulkhead 84 by fasteners 100. Opening of pilot valve 40 establishes relatively unrestricted liquid communication between the control chamber 56 and the outlet region 58 by way of a passage 102 defined internally of bulkhead 84. Passage 102 terminates at an annular groove 104 around the circumference of bulkhead 84. Groove 104 communicates with outlet region 58 through flow recesses defined between numerous splines 106 formed on the internal wall of body 46 around cavity 54. These grooves permit axial flow in the region outside of the diaphragm 72.

Venting of control chamber 56 causes main valve assembly 38 to stroke relatively rapidly from the closed position to a fully open position defined by engagement of abutments 108 on piston guide member 66 against rib 92 of bulkhead 84. As main valve assembly 38 approaches this fully open position, an extending nose portion 110 of the restrictor screw 60 closes pilot valve 40 in the manner described below.

After pilot valve 40 is reclosed, liquid communication along the restricted flow path 79 causes the main valve assembly 38 to move more gradually from the fully open position to the closed position. During this movement, a predictable and controlled flow of liquid occurs between the inlet port 30 and the outlet port 34. This flow is configured by the metering plug 68 in cooperation with the internal wall 112 of the valve seat portion 52 of inlet tube 48.

Rolling diaphragm 72 provides essentially frictionless movement of the main valve assembly 38, and avoids difficulties encountered with other types of valve mechanisms due to spring effect, elastic memory, friction and the like. The cross sectional area of control chamber 56 encircled by diaphragm 72 is approximately twice the cross sectional area of the throat area of the valve seat 78. After pilot valve 40 closes, control chamber 56 refills at a rate governed by the area of restricted flow path 79. This provides a controlled closing speed of the main valve.

During the operating cycle of the metering flush valve 22 as the main valve assembly moves toward its closed position, pressure in the control chamber 56 stabilizes at a level approximately midway between the inlet pressure existing at inlet port 30 and the downstream pressure in the outlet region 58. This results from the approximate two-to-one area relationship between the main valve assembly and orifice throat defined by the main valve seat. Due to the proportional relationship of the differential between the supply and discharge pressures on the one hand and the pressure acting during a cycle in control chamber 56 on the other hand, the metering valve 22 is capable of delivering a generally constant volume of water over a wide range of supply pressures. When the inlet pressure and the inlet/discharge pressure differential are large, the flow rate through the valve is large but the main valve assembly closes more rapidly than with a small pressure differential.

Opening of the pilot valve 40 to initiate a cycle of operation is accomplished by the actuator assembly 44 and the pilot valve operating assembly 42. When lever 26 is pivoted away from its normal position coinciding with the axis of the housing 28, metering rod 82 is moved in an axial direction to initiate delivery of liquid through the metering valve.

Lever 26 includes a base flange 114 captured beneath an end wall 116 of collar 88, and lever 26 extends outwardly through an opening 118 in wall 116. The outermost surface of the base flange 114 bears against a sleeve 120 fitting within collar 88. The innermost wall of base flange 114 abuts a cap member 122 having a central hub portion 124 in which metering rod 82 is securely attached as by a press fit. A spring 126 held in compression between aligned grooves in the bulkhead 84 and the cap 124 biases the cap 122, the base flange 114 and the sleeve 120 against the end wall 116. In the standby condition, the force of the spring serves to hold the lever 26 in its axial position.

When lever 26 is pivoted or rocked, base flange 114 acts as a lever to force cap 122 inwardly. This causes the metering rod 82 also to move inwardly in the axial direction toward the inlet port 30. Friction and wear are prevented by forming both the sleeve 120 and the cap 122 of a plastic material such as nylon.

Pilot valve operating assembly 42 provides a "non-hold open" characteristic so that the metering valve 22 cannot be maintained in an open condition. In addition, the assembly 42 provides an over center snap acting movement for opening and closing the pilot valve 40.

Snap acting motion is achieved by mounting the trip plate 94 for over center movement between its two extreme positions in which pilot valve 40 is alternately open or closed. Trip plate 94 includes a generally T-shaped opening 128 defining a pivot edge 130. Edge 130 is pivotally received in a nest-like structure defined on pilot valve base 98. Base 98 includes a pair of upwardly extending arms 132 having projections 134 confining edge 130 against movement away from bulkhead 84. A central projection 136 of the pilot base 98 includes a pair of base portions 138 preventing movement of the edge 130 in the direction of the bulkhead 84.

Edge 130 is held by a spring 142 in engagement with a pivot support surface 140 defined on arms 132 and/or projection 136. A guide 144 has a notched head 146 in which a portion 148 of plate 94 is seated. The shank of guide 144 slidably receives the shank portion of a slipper shoe 150 having a head 152. Spring 142 encircles the slidably interfitting shanks of the shoe 150 and guide 144.

Spring 142, guide 144 and shoe 150 define a spring assembly held in compression between the restrictor rod 82 and portion 148 of plate 94. Head 152 is capable of limited movement with respect to the pilot valve base 98. More specifically, the head 152 is captured within a slot 156 in the central projection 136 and can move between a valve closed position illustrated in FIG. 3 and an alternative valve open position illustrated in FIG. 8. Trip plate 94 also moves between two extreme positions under the influence of spring assembly 154. In the valve closed position, valve member 93 is biased into contact with valve seat 96. In the alternative open position, plate 94 rests against abutments 158 of the pilot base 98. Due to the effect of spring assembly 154, the movement of plate 94 and thus of the pilot valve member 93 mounted thereon is bistable and snap acting.

The effect of friction between the slipper shoe head 152 and the restrictor rod 82 is utilized to provide the non-hold open feature. Spring assembly 154 applies a spring force of the shoe 150 against the rod 82 in the direction of the axis of the spring assembly. In the pilot valve closed position of FIG. 3, the axis of spring assembly 154 is very close to perpendicular to the axis of rod 82. When rod 82 is moved in the axial direction by the actuator assembly 44, friction between the rod 82 and the shoe 150 causes the shoe 150 to follow the rod and move over center from the position of FIG. 3 with a rapid snap action to the position of FIG. 8.

Once the slipper shoe 150 has reached its alternate position with the pilot valve 40 opened, movement of rod 82 does not result in the movement of the slipper shoe 150. In the valve open position, the angle between spring assembly 154 and rod 182 is smaller and the spring force is applied at an angle further from perpendicular. The component of this force parallel to the axis of rod 82 is therefore greater than the frictional force in the direction parallel to the rod axis and the frictional force cannot overcome the spring force. As a result, head 152 of shoe 150 slips along the surface of rod 82 and cannot be moved by the rod. This arrangement provides a one-way clutch effect since metering rod 182 can move the shoe 150 in the direction toward the inlet 30 but not in the opposite direction.

After a cycle of operation is initiated, the pilot valve 40 is unaffected by release of the lever 26. Movement of rod 82 away from the inlet port 30 does not result in the movement of shoe 150. Similarly, a second actuation of rod 82 in the direction of the inlet port while pilot valve 40 is open has no effect.

When main valve assembly 38 moves from the closed to the open position in response to pilot valve 40, the nose portion 110 of the restrictor screw 60 engages the slipper shoe 150 and returns it from the position of FIG. 8 to the position of FIG. 3. This closes pilot valve 40 and causes the cycle of operation of the metering valve 22 to continue until completed. Even if the operating lever 26 is held in its tilted position, pilot valve 40 nevertheless recloses so that the cycle of operation is completed and the valve cannot be held in the open position.

Comparison of the embodiments of FIGS. 3 and 11 demonstrate that the metering valve 22 can be actuated either by the operating lever 26 or alternatively by a pushbutton 160 with substantial commonality of parts. Components unchanged in these two embodiments are designated by the same reference numerals.

In the pushbutton operated version, a base flange 162 of the pushbutton 160 is captured beneath an end wall 164 of a collar or cap member 166 having a central opening 168 through which pushbutton 160 outwardly extends. Spring 126 normally biases cap 122 against pushbutton 160 holding it in its normal position illustrated in FIG. 11.

The same spring 126 is used either in the lever or pushbutton actuated embodiment. Sleeve 120 is not used in the pushbutton version. Collar 166 is sized so that in the standby condition, spring 126 is compressed to a lesser degree and provides a smaller spring force. The spring force is large enough to maintain the pushbutton in the illustrated standby condition, and pushbutton 160 is easily depressed to initiate a cycle of operation by axially moving the cap 122 and restrictor rod 82. The parts for either pushbutton or lever actuation may be supplied as a kit, and the metering valve 22 can be modified simply by removing the collar 88 or 166 and installing the desired group of parts. Seal 90 frictionally retains bulkhead 84 in position, and these components, as well as other components including the cap 122 and rod 82 need not be disassembled.

The flow of liquid through the metering valve 22 in a cycle of operation is configured by the metering plug 68 best illustrated in FIG. 7. The metering plug 68 includes a central radially oriented wall 170 clamped in position by the restrictor screw 60 against a central hub portion of the piston body 70. Plug 68 is double ended and may be installed in either of two positions to provide different flow configurations.

In the orientation shown in FIG. 3, metering plug 68 is installed with a first end 172 directed toward the inlet port 30. End 172 is shaped to provide the desired flow sequence for water closet plumbing fixtures illustrated in graphical form with the solid line of FIG. 12. The opposite end 174 of plug 68 is configured to provide a different flow characteristic for urinal plumbing fixtures graphically illustrated with the dotted line in FIG. 12.

With reference more specifically to FIG. 7, ends 172 and 174 terminate with similar annular barrier portions or ribs 176 and 178 received with limited clearance in bore 112 of the inlet tube 48. Widely spaced ribs 180 extend in the axial direction between the barrier portions 176 and 178.

In the water closet arrangement illustrated in FIG. 3, flow is controlled by end 172 of the plug 68. This end includes relatively large area openings 182 each flanked in the axial direction by a shallow recess 184. At one of side of the openings 182, the recess tapers radially outward to merge with the barrier rib 176. At the opposite side, the recess 184 tapers radially outwardly to join a generally cylindrical wall 186 extending beyond the plane of the central wall 170 to the barrier rib 178.

In a cycle of operation in the water closet mode, as the main valve assembly 38 reaches the fully open position, a relatively large volume of water initially flows through the metering valve 22 from the inlet port 30 to the outlet port 34. The large volume is accommodated by flow through the large area openings 182 and the recess 184. As the main valve assembly travels toward the closed position, wall 186 moves past the valve seat 78 and into the bore 112. At this point, the flow decreases. The relatively high volume flow followed by a relatively low volume flow is shown with a solid line in FIG. 12. This flow configuration supplied to a water closet plumbing fixture provides an initial siphon flushing action, followed by a fixture trap refill operation.

In the alternate urinal mode, the metering plug 68 is installed in its reversed position with end 174 directed toward the inlet port 30. In this mode, the flow is configured as shown in the dotted lines of FIG. 12 for a wash down flushing action. End 174 includes a number of relatively small area openings 188 extending to the cylindrical wall 186. This configuration provides a relatively uniform and relatively low fluid delivery rate throughout the cycle of operation. Metering plug 68 may be reversed in its position or different metering plugs providing other configurations may be installed in the metering valve 22 without removing the metering valve 22 from the water system.

In the flushing system 20 illustrated in FIG. 1, the inlet conduit 32 communicates with the outlet of control stop 24. Conduit portion 32 includes a groove near its end in which an O-ring seal 190 is captured. This seal engages the internal wall of an extension fitting 192 connected between the metering flush valve 22 and an outlet fitting 194 of the control stop 24. A coupling nut 196 is threaded over the extension fitting 192 and urges a lock ring 198 firmly against the conduit portion 32. A seal 200 is engaged between extension fitting 192 and the body of the control stop 24.

Fittings of different length may be provided to accommodate different distances between the control stop 24 and the metering valve 22. For a closer spacing than that illustrated in FIG. 1, the extension fitting 192 may be eliminated and the conduit portion may extend into the outlet fitting 194 of the control stop 24. In this type of installation, the coupling nut 196 is threaded onto the outlet fitting 194.

While the invention has been described with reference to details of the illustrated embodiments, such details are not intended to limit the invention as defined in the appended claims.

What is claimed as new and desired to be secured by Letters Patent of the United States is:

1. In a metering valve of the type including a housing having inlet and outlet ports, a main valve controlling flow from the inlet port to the outlet port, a control chamber in pressure communication with the main valve for applying control pressure to the main valve, a restricted flow path from the inlet port to the control chamber for increasing the control pressure and holding the main valve closed in a standby condition, a pilot valve in communication with the control chamber for reducing control pressure to initiate a cycle of operation of the main valve, and an actuator for opening the pilot valve, the improvement characterized by:
   a bistable snap acting mechanism coupled to the pilot valve and movable between two stable positions for alternately opening and closing said pilot valve; and
   operating means connected between the actuator and said snap acting mechanism for moving said snap acting mechanism from the closed to the open position to open said pilot valve in response to operation of said actuator.

2. In a metering valve of the type including a housing having inlet and outlet ports, a main valve controlling flow from the inlet port to the outlet port, a control chamber in pressure communication with the main valve for applying control pressure to the main valve, a restricted flow path from the inlet port to the control chamber for increasing the control pressure and holding the main valve closed in a standby condition, a pilot valve in communication with the control chamber and movable from a closed to an open condition for reducing control pressure to initiate a cycle of operation of the main valve, and an actuator for opening the pilot valve, the improvement characterized by:
   a bistable snap acting mechanism coupled to the pilot valve and movable between two stable positions for alternately opening and closing said pilot valve; and
   operating means connected between the actuator and said snap acting mechanism for moving said snap acting mechanism from the closed to the open position to open said pilot valve in response to operation of said actuator;
   said actuator including a movable element engagable with said snap acting mechanism movable in a first direction when the actuator is operated and movable in a second direction when said actuator is released, and one way clutch means interconnecting said element and said snap acting mechanism.

3. The improvement claimed in claim 2, said one way clutch means moving said snap acting mechanism only from said closed to said open position, and means on said main valve for closing said pilot valve when said main valve is opened.

4. The improvement claimed in claim 3 wherein said means on said main valve is engagable with said snap acting mechanism in the full open position of said main valve.

5. The improvement claimed in claim 2, said one way clutch means including a slipper member in contact with said movable element and means permitting said slipper member to slip in only one direction on said movable element.

6. The improvement claimed in claim 5, said permitting means including a spring biasing said slipper member toward said element and stop means limiting said slipper member to movement between two over center positions in which the direction of application of spring force to said movable element is different.

7. The improvement claimed in claim 6 wherein said spring also biases said snap acting mechanism toward said two over center positions.

8. The improvement claimed in claim 2 wherein said main valve includes a valve seat communicating with said inlet port and a valve piston movable toward and away from said inlet port.

9. The improvement claimed in claim 8, said movable element comprising a rod extending through said valve piston and movable relative thereto, and said restricted passage being defined between said rod and said valve piston.

10. A metering valve comprising a housing having inlet and outlet ports, a main valve controlling flow from the inlet port to the outlet port, a control chamber in pressure communication with the main valve for applying control pressure to the main valve, a restricted flow path from the inlet port to the control chamber for increasing the control pressure and holding the main valve closed in a standby condition, a pilot valve in communication with the control chamber for reducing control pressure to initiate a cycle of operation of the main valve, an actuator for opening the pilot valve, said housing including a generally cylindrical wall defining a cavity, a valve seat in said cavity defining a main flow path between said inlet port and said cavity, said main valve including a piston assembly reciprocally movable in said cavity and including a valve portion engagable with said valve seat, an axially directed opening extending through said piston assembly from said control chamber to said inlet port, and a guide rod extending through said opening with a clearance defining said restricted passage, said valve seat being defined by a cylindrical surface extending into said cavity from said inlet port, and said piston assembly including a flow metering member received in coaxial sliding relation with said cylindrical surface, said metering member and said cylindrical surface being generally parallel and closely spaced with recess means defined therebetween for configuring flow from said inlet port past said valve seat as a function of the movement of said piston assembly.

11. A metering valve as claimed in claim 10, said metering member being double ended and reversably mounted in said piston assembly and having different shapes at each end for providing selectably different flow configurations.

12. A metering valve as claimed in claim 11, one said flow configuration being for water closet flushing and the other said configuration being for urinal flushing.

13. A metering valve comprising a housing having inlet and outlet ports, a main valve controlling flow from the inlet port to the outlet port, a control chamber in pressure communication with the main valve for applying control pressure to the main valve, a restricted flow path from the inlet port to the control chamber for increasing the control pressure and holding the main valve closed in a standby condition, a pilot valve in communication with the control chamber for reducing control pressure to initiate a cycle of operation of the main valve, an actuator for opening the pilot valve, said housing including a generally cylindrical wall defining a cavity, a valve seat in said cavity defining a main flow path between said inlet port and said cavity, said main valve including a piston assembly reciprocally movable in said cavity and including a valve portion engagable with said valve seat, a cylindrical rolling diaphragm telescoped within said cylindrical housing wall having a first end in sealed relation with said housing spaced from said valve seat, a single threaded element holding said piston assembly in assembled relation, an axially directed opening extending through said threaded element from said control chamber to said inlet port, and a guide rod extending through said opening with a clearance around said guide rod within said axially directed opening defining said restricted passage.

14. A kit for a toilet fixture metering flush valve capable of being either button-actuated or lever-actuated, said metering flush valve comprising a housing, a main valve in said housing for controlling liquid flow through said housing, a pilot valve for initiating operation of said main valve in a flushing cycle, means for operating said pilot valve in response to movement of an operator member away from a home position, a cap removably attached to one end of said housing, and a spring for biasing said operator member toward said home position, said kit comprising a lever having a base flange, a lever collar removably attachable to said housing for capturing said lever base flange in said housing and compressing said spring with said lever base flange, a button having a base flange, a button collar removably attachable to said housing for capturing said button base flange in said housing and compressing said spring with said button base flange, said lever base flange and lever collar being constructed and arranged to preload said spring substantially more than said button base flange and button collar in order to provide a larger spring force for lever actuation than for button actuation.

* * * * *